(12) United States Patent
Morero et al.

(10) Patent No.: US 10,164,715 B2
(45) Date of Patent: Dec. 25, 2018

(54) ADAPTIVE DEMAPPER

(71) Applicant: INPHI CORPORATION, Santa Clara, CA (US)

(72) Inventors: Damian Alfonso Morero, Santa Clara, CA (US); Martin Carlos Asinari, Santa Clara, CA (US); Martin Ignacio Del Barco, Santa Clara, CA (US); Mario Rafael Hueda, Santa Clara, CA (US); Lucas Javier Yoaquino, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/011,470

(22) Filed: Jun. 18, 2018

(65) Prior Publication Data
US 2018/0302168 A1    Oct. 18, 2018

Related U.S. Application Data

(63) Continuation of application No. 15/187,711, filed on Jun. 20, 2016, now Pat. No. 10,027,423.

(60) Provisional application No. 62/183,084, filed on Jun. 22, 2015.

(51) Int. Cl.
| H04B 10/2513 | (2013.01) |
| H04L 27/06 | (2006.01) |
| H04B 10/61 | (2013.01) |
| H04L 25/06 | (2006.01) |

(52) U.S. Cl.
CPC ......... H04B 10/616 (2013.01); H04L 25/067 (2013.01)

(58) Field of Classification Search
CPC .......................... H04B 10/616; H04L 25/067
USPC ............... 375/260, 261, 340, 341, 262, 316; 398/140, 147, 148, 149, 150
See application file for complete search history.

(56) References Cited

U.S. PATENT DOCUMENTS

2012/0274364 A1* 11/2012 Chen ................... H03M 1/0836
                                                           327/101

* cited by examiner

*Primary Examiner* — Tesfaldet Bocure
(74) *Attorney, Agent, or Firm* — Richard T. Ogawa; Ogawa P.C.

(57) ABSTRACT

An adaptive demapper adaptively demaps an input symbol. An input symbol is received and demapped in a hard-output demapper to generate a current detected symbol corresponding to a constellation point on a current constellation closest to the input symbol. A corrected inverse of a current noise power estimate is determined by updating a previous noise power estimate based on a difference between the input symbol and the current detected symbol. In a soft-output demapper, a log likelihood ratio corresponding to the current detected symbol is determined based on the corrected inverse of the current noise power estimate. The constellation point in the current constellation corresponding to the current detected symbol is then updated to generate an updated constellation based on a difference between the constellation point and the received input symbol.

39 Claims, 7 Drawing Sheets

ADAPTIVE DEMAPPER

RELATED APPLICATIONS

This application is a continuation of U.S. patent application Ser. No. 15/187,711 filed Jun. 20, 2016, now issued as U.S. patent Ser. No. 10/027,423 on Jul. 17, 2018, which claims the benefit of U.S. Provisional Application No. 62/183,084 filed on Jun. 22, 2015, the contents of which are incorporated by reference herein.

BACKGROUND

1. Field of the Art

The disclosure relates generally to a coherent receiver, and more specifically, to an adaptive demapper in a coherent receiver.

2. Description of the Related Art

Due to the increasing demand for higher transmission rates in fiber-optic communications, more complex transceivers with higher throughput are desirable. To achieve the latter, modulation schemes are growing in complexity, moving towards higher bits per baud like QAM16 and QAM64. These modulations are more susceptible to noise and distortions than lower bits per baud modulations. In particular, non-linearities present in different parts of an optical receiver can add noise that does not follow a Gaussian distribution. This type of noise can represent significant performance penalties since forward error correction (FEC) codes implemented in the receivers are designed to counter the effects of Gaussian noise.

SUMMARY

An adaptive demapper adaptively demaps an input symbol. An input symbol is received and demapped in a hard-output demapper to generate a current detected symbol corresponding to a constellation point on a current constellation closest to the input symbol. A corrected inverse of a current noise power estimate is determined by updating a previous noise power estimate based on a difference between the input symbol and the current detected symbol. In a soft-output demapper, a log likelihood ratio corresponding to the current detected symbol is determined based on the corrected inverse of the current noise power estimate. The constellation point in the current constellation corresponding to the current detected symbol is then updated to generate an updated constellation based on a difference between the constellation point and the received input symbol.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Figure 1:
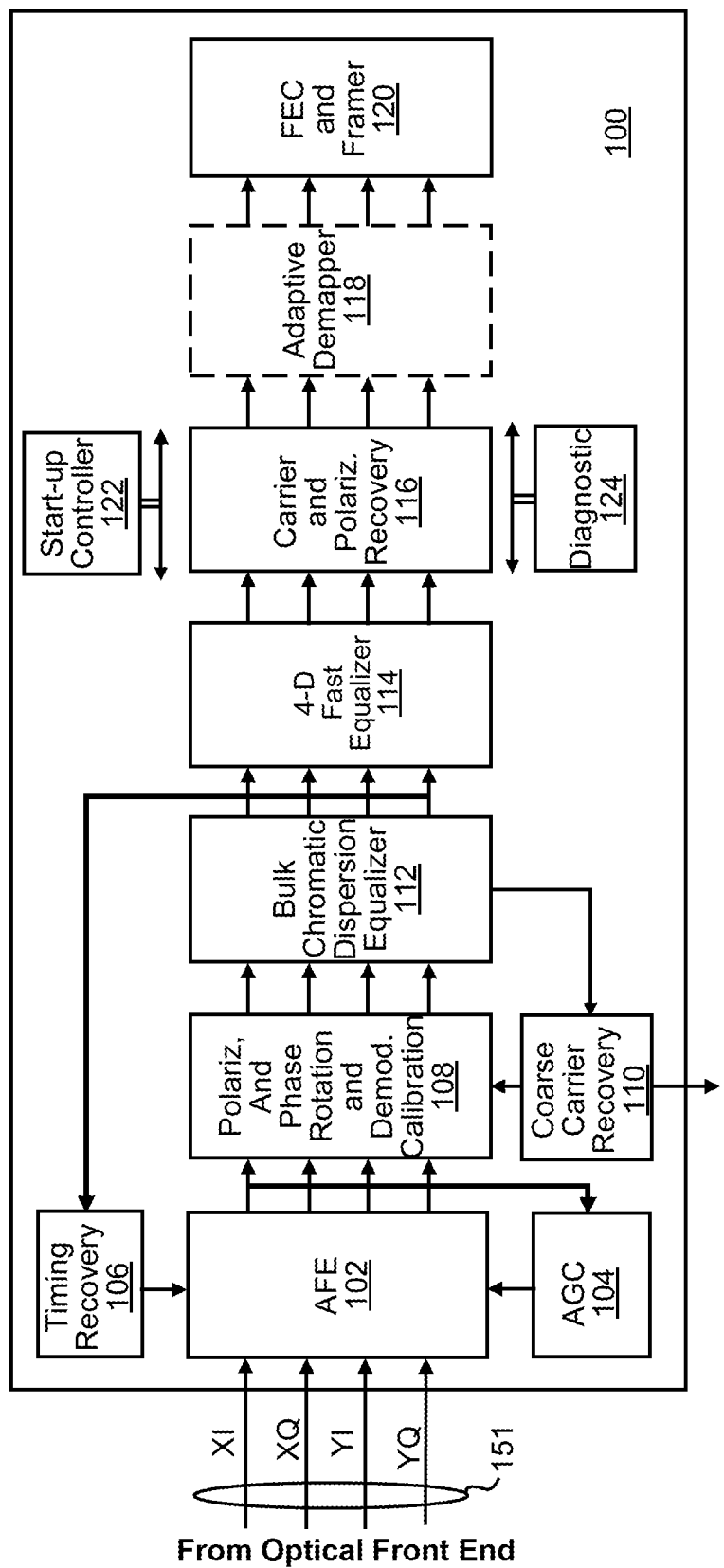
FIG. 1 illustrates an embodiment of a digital communications receiver.

FIG. 1 illustrates an embodiment of a digital communications receiver 100. The receiver 100 receives input signals 151 from an optical front end and generates output signals for a framer interface (e.g., a SERDES Framer Interface Level 5 or other framer interface). In an embodiment, the receiver 100 comprises an analog front end (AFE) 102, an automatic gain control module (AGC) 104, a timing recovery module 106, a polarization, phase rotation, and demodulation calibration module 108, a coarse carrier recovery module 110, a bulk chromatic dispersion equalizer 112, a 4-D fast equalizer 114, a carrier and polarization recovery module 116, an adaptive demapper 118, a forward error correction (FEC) and framer module 120, a start-up controller 122, and a diagnostic module 124.

The AFE 102 samples analog input signals 151 from an optical front end to convert the analog input signals to digital input signals. In an embodiment, the analog input signals are signals that have been converted from optical signals in optical front end. These optical signals have two polarizations (e.g., a horizontal and vertical polarization, or more generally, an "X" and "Y" polarization) in which each polarization includes an in-phase signal and a quadrature signal. Thus, the analog input signals may be represented as four signals denoted as XI (in-phase, X polarized), XQ (quadrature-phase, X polarized), YI (in-phase, Y polarized), and YQ (quadrature-phased, Y polarized). The in-phase and quadrature-phase signals in each polarization may alternatively be represented as a complex signal having a real portion corresponding to the in-phase signal and an imaginary portion corresponding to the quadrature signal. Furthermore, the two polarizations including all four signals 151 can collectively be treated mathematically as a two-dimensional complex vector, where each component of the vector corresponds to one of the polarizations of the received optical signal and is expressed as a complex representation of in-phase and quadrature signals.

In an embodiment, the AFE 102 samples the analog input signals 151 based on a sampling clock provided by the timing recovery module 106. Furthermore, the AFE 102 may apply a gain to the sampled input signals based on a gain control signal from the AGC module 104, which is adjusted in a feedback loop based on the digital output of the AFE 102. The polarization, phase rotation, and demodulation calibration module 108 applies a rotation to the digital input signals to correct for skew and/or amplitude differences between the in-phase and quadrature components that may have been introduced in the optical channel, due to, for example, polarization mode dispersion (PMD). In an embodiment, the amount of rotation is determined at least in part by a coarse carrier recovery module 110, which supplies a control signal to the polarization, phase rotation, and demodulation calibration module 108. The bulk chromatic dispersion equalizer 112 equalizes the digital signals to compensate for chromatic dispersion effects that may be introduced in the optical channel. Parameters of the bulk chromatic dispersion equalizer 112 may be used by the timing recovery module 106 and coarse carrier recovery module 110 in respective feedback loops.

The timing recovery module 106 estimates the frequency and phase of the data signals outputted by the bulk chromatic dispersion equalizer 112 and generates timing information used sample the analog input signals 151 in the AFE 102. The 4-D fast equalizer 114 further equalizes the digital signals to reduce signal distortion. For example, the 4-D fast equalizer may compensate for intersymbol interference (ISI) effects imposed by the optical and electrical channels that may be caused by residual chromatic dispersion, polarization mode dispersion, and bandwidth effects. The carrier and polarization recovery module 116 receives equalized samples from the 4-D fast equalizer 114 and estimates and compensates for frequency and phase differences between the carrier signal and a local oscillator.

The adaptive demapper 118 decodes the digital signals into symbols. A detailed description of the adaptive demapper is described in further detail below with respect to FIGS. 2-7. The FEC and framer 120 performs error correction and frames the data according to a framing protocol suitable for the external framer interface.

The start-up controller 122 performs various startup control operations. The diagnostic module 124 may receive data from various components of the receiver 100 and perform diagnostic analysis.

In one embodiment, the receiver 100 is implemented as an application specific integrated circuit (ASIC). Furthermore, portions of the transceiver receiver may be implemented as a processor (e.g., a digital signal processor) and a non-transitory computer-readable storage medium that stores computer-executable instructions. During operation, the processor loads and executes the instructions to carry out the functions described herein. Other functional modules of the receiver 100 may be implemented in hardware, firmware, or a combination of software, hardware, and/or firmware.

Figure 2:
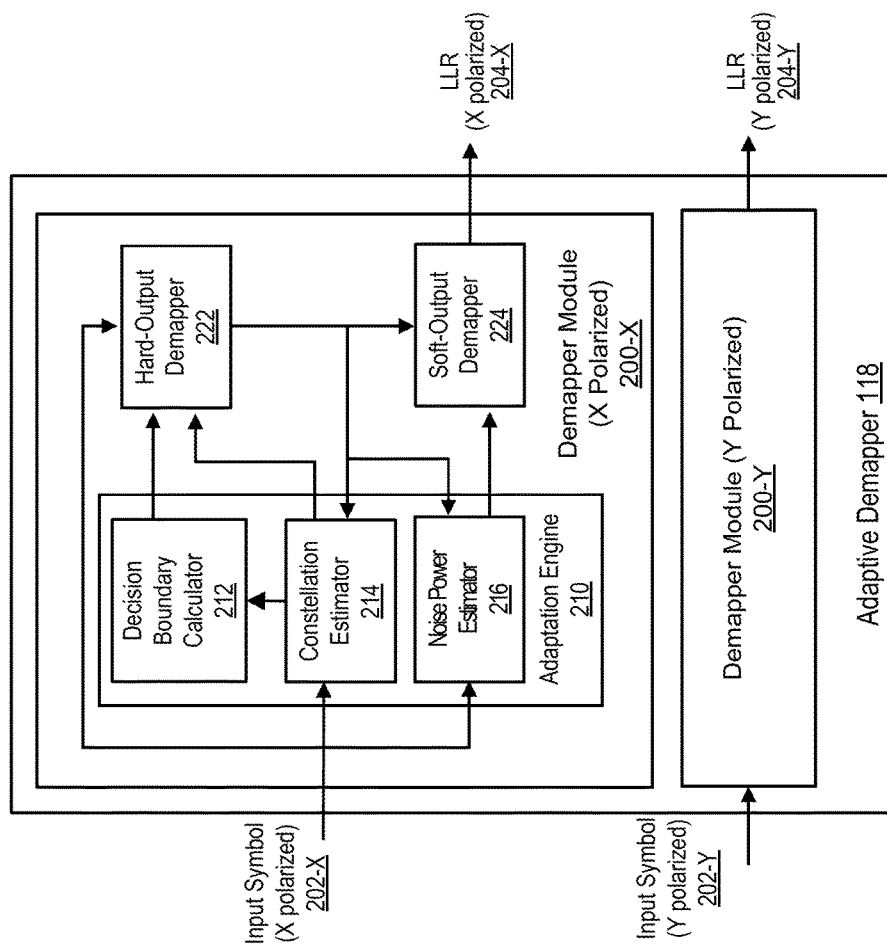
FIG. 2 illustrates an embodiment of an adaptive demapper.

FIG. 2 illustrates a more detailed embodiment of the adaptive demapper 118. In an embodiment, the adaptive demapper 118 comprises a first demapper module 200 that operates on a complex input symbol 202-X corresponding to the in-phase (XI) and quadrature (XQ) components of the X-polarized input signals to generate a first log likelihood ratio (LLR) 204-X, and a second demapper module 200-Y that operates on a complex input symbol 202-Y corresponding to the in-phase (YI) and quadrature (YQ) components of the Y-polarized input signals to generate a second LLR 204-Y. For conciseness, only the details of the first demapper module 200-X are illustrated. The second demapper module 200-Y may have an equivalent architecture and perform equivalent processes. Thus, for clarity of description herein, the first demapper module 200-X and second demapper module 200-Y are generally referenced herein as a demapper module 200 which operates on an input signal 202 and produces an LLR 204.

In an embodiment, the demapper module 200 comprises an adaptation engine 210, a hard-output demapper 222, and a soft-output demapper 224. The adaptation engine 210 comprises three primary components: a constellation estimator 214 to estimate the constellation points of the received input symbol 202, a noise power estimator 216 to estimate the noise power in each of the real and imaginary component of the received input symbol 202, and a decision boundary calculator 212 to determine, based on the constellation points, decision-boundaries for use by the hard-output demapper 222 to distinguish between different symbols. The estimates and metrics produced by the adaptation engine 210 help improve the performance of the demapping process while reducing the complexity of the algorithm in comparison with a brute force approach (i.e., computing the distance of the received input symbol 202 to all valid constellation points and finding the one with minimum distance). The individual components of the adaptation engine 210 are described in further detail below.

The constellation estimator 214 estimates each of M constellation points from a sequence of received input symbols 202 based on the following equation:

$$c_k[n]=(r[n]c_k[n-1])\cdot \beta_c+c_k[n-1] \quad (1)$$

where n is a discrete time index, r [n] is the demapper input symbol at time n, k is an index of the constellation point determined by the hard-output demapper 222 as corresponding to the received input symbol r [n], $c_k$ [n] is the estimation of the $k^{th}$ constellation symbol at time n, and $\beta_c$ is a predefined parameter that controls the tradeoff between the estimation error and tracking speed. In an embodiment, the constellation estimator 214 initially initializes the constellation points $c_k[0]$ for k=0, 1, . . . , M−1 with the ideal M points of the constellation without distortions. For example, the initial constellation points may be equally spaced and centered at the origin. With each received input symbol 202, the position of the constellation symbol corresponding to the received input symbol r [n] as determined by the hard-output demapper 222 is updated according to Eq. (1), making the constellation points converge to a shape consistent with the received symbols over time. In this way, possible deformations caused by linear or non-linear distortions in previous stages of the receiver (including, for example, the optical and electrical components in the transmission channel) may be compensated. The updated constellation symbol $c_k$ [n] is outputted to the hard-output demapper 222 and to the decision boundary calculator 212. An example embodiment of a constellation estimator 214 is described in further detail below with reference to FIG. 5.

The noise power estimator 216 estimates the variances $\sigma_i^2[n]$ and $\sigma_q^2[n]$ of the noise present in the real and imaginary part, respectively, of the received symbol r[n]. For example, in one embodiment, the variances are calculated based on the following equations:

$$\sigma_i^2[n]=(1-\beta_i)\cdot\sigma_i^2[n-1]+\beta_i\cdot(\text{real}\{r[n]-\hat{r}[n]\})^2 \quad (2)$$

$$\sigma_q^2[n]=(1-\beta_q)\cdot\sigma_q^2[n-1]+\beta_q\cdot(\text{imag}\{r[n]-\hat{r}[n]\})^2 \quad (3)$$

where $\beta_i$ and $\beta_q$ are parameters for the real and imaginary portions respectively of the calculation, and $\hat{r}$ [n] represents the detected symbol from the hard-output demapper 222. The inverse sigma square value outputted to the soft-output demapper 224 may then be computed as follows:

$$inv(\sigma_i^2[n]) = \frac{\alpha_i}{\sigma_i^2[n]} \quad (4)$$

$$inv(\sigma_q^2[n]) = \frac{\alpha_q}{\sigma_q^2[n]} \quad (5)$$

where $\alpha_i$ and $\alpha_q$ are predefined correction factors that compensates the bias generated due to errors in the estimated symbol $\hat{r}[n]$. Alternatively, this bias can be avoided by using pilot symbols instead of the estimated symbol $\hat{r}[n]$. An example embodiment of a noise power estimator is described in further detail below with reference to FIG. 6.

The decision boundary calculator 212 computes a set of reference frontiers based on the estimated constellation symbols received from the constellation estimator 214. The reference frontiers may be used to detect the input symbol in a smaller subset of constellation points in order to reduce complexity. A detailed description of the frontier computations is described below.

The hard-output demapper 222 receives the input symbols 202 and for each input symbol 202, determines the estimated symbol $\hat{r}[n]$ corresponding to the constellation symbol closest to the input symbol r[n] from the set of possible constellation symbols $C[n]=\{c_k(n):k=0, 1, \ldots, M-1\}$ estimated by the constellation estimator 214. For example, in one embodiment, the hard-output demapper computes $\hat{r}[n]$ as follows:

$$\hat{r}[n] = \arg\min_{c \in C[n-1]} |r[n]-c|^2 \quad (6)$$

Eq. (6) thus involves computing M square distances and finding the minimum distance. For large constellations this approach may involve a significant amount of computation, particularly in high-speed applications. Thus, in one embodiment, the number of distances that are computed and compared in the hard-output demapper 222 may be reduced by partitioning the set of constellation points into a plurality of smaller overlapped subsets and computing the distances associated to the points in only one of these subsets.

Figure 3:
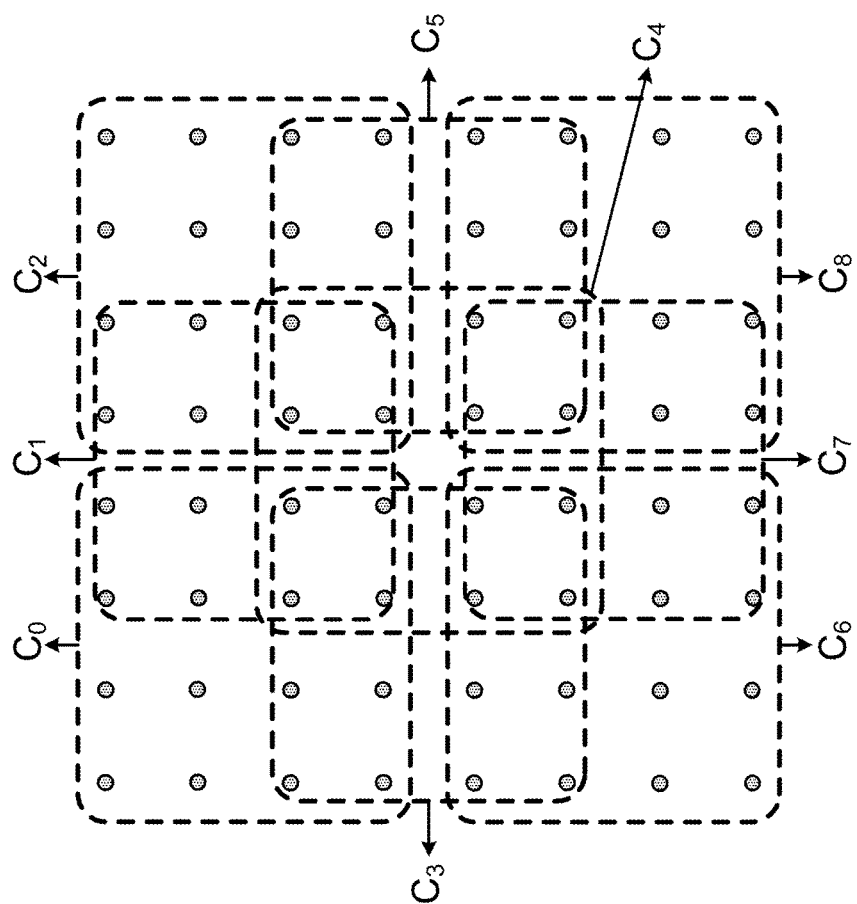
FIG. 3 illustrates an example QAM64 constellation with 9 overlapping subsets of constellation points.

FIG. 3 illustrates an example of a partitioned constellation for a QAM64 constellation partitioned into 9 overlapping subsets, $C_j[n]$ with j=0, 1, . . . , 8. As can be seen, each constellation point is associated with at least one subset and the subsets each overlap at least one other subset. In different embodiments, different constellation sizes and different numbers of subsets may be used.

More generally, a subsets $C_j[n]$ with j=0, 1, . . . , L−1 may denote the $j^{th}$ subset of a constellation C[n] having L subsets. Furthermore, $\bar{c}_j[n]$ be a representant (e.g., an average point) of a subset j. The hard-output demapper 222 may compute a hard-output decision as:

$$\hat{r}[n] = \arg\min_{c \in C_P[n-1]} |r[n]-c|^2 \quad (7)$$

where $$p = \arg\min |r[n]-\bar{c}_j[n-1]|^2$$
$$j=0, \ldots, L-1 \quad (8)$$

$$\bar{c}_j[n] = \frac{1}{|C_j[n]|} \sum_{c \in C_j[n]} c \quad (9)$$

Thus, to apply the equations above, the hard-output demapper 222 may first compute the representants $\bar{c}_j[n]$ of each subset j as described in Eq. (9) and then determine which representant is closest (e.g., minimum distance) to the received input symbol r[n] as described in Eq. (8). The hard-output demapper 222 then determines the distances to each constellation point in the subset p having the representant with the minimum distance, and assigns the estimated symbol $\hat{r}[n]$ to the constellation point in the subset p having the minimum distance. This approach can be repeated hierarchically by considering the set of subset-representants $\{\bar{c}_j[n]:j=0, 1, \ldots, L-1\}$ as the center of a new constellation. For example, rather than directly compare the received input symbol r[n] to each representant $\bar{c}_j[n]$ of each subset j as described in Eq. (8), the representants $\bar{c}_j[n]$ may be grouped into overlapping sub-subsets, a sub-representant may be determined for each sub-subset, and the input symbol r[n] may be compared to the sub-representants to determine which sub-subset is closest. Then, the input symbol r[n] may be compared only to the representants $\bar{c}_j[n]$ in that subset. This may be repeated for any number of hierarchical levels, which may depend in part of the size of the original constellation.

In an alternative embodiment, the subset index p can be computed based on a boundary decision instead of distance computations as described in Eq. (8). This may involve the pre-computation of decision-boundaries between the subsets. Due to the overlap property of the subsets, the boundaries can be approximated by lines aliened to the Cartesian axes with negligible penalty. Therefore, instead of applying Eq. (8) above, the subset index p can instead be computed as:

$$p = f(d_{1,1}, \ldots, d_{1,q}, d_{2,1}, \ldots, d_{2,q}) \quad (10)$$

where $f(\bullet)$ is the index decision rule (e.g., a pre-computed index decision rule stored in memory) based on the frontier decisions $d_{1,j}$ and $d_{2,j}$ with $$d_{1,j} = \begin{cases} 1 & \text{real}(r[n]) > v_{1,j} \\ 0 & \text{other} \end{cases} \quad (11)$$

$$d_{2,j} = \begin{cases} 1 & \text{imag}(r[n]) > v_{2,j} \\ 0 & \text{other} \end{cases} \quad (12)$$

and $v_{1,j}$ and $v_{2,j}$ with j=1, 2, . . . , q are real and imaginary decision frontiers respectively computed by the decision boundary calculator 212. Several approaches can be used in the decision boundary calculator to compute the decision frontiers. For example, in one embodiment the set of frontiers determined by the decision boundary calculator 212 may be based on a mean point between two different neighbor subset representatives $\bar{c}_j[n]$, e.g.:

$$\{v_{1,j}: j=1, \ldots, q\} = \left\{\text{real}\left(\frac{\bar{c}_i[n] + \bar{c}_j[n]}{2}\right): \forall i \neq j, \right.$$
$$\left. \text{with } i, j = 0, 1, \ldots, L-1 \text{ and } C_i[n] \cap C_j[n] \neq \phi\right\} \quad (13)$$

$$\{v_{2,j}: j=1, \ldots, q\} = \left\{\text{imag}\left(\frac{\bar{c}_i[n] + \bar{c}_j[n]}{2}\right): \forall i \neq j, \right.$$
$$\left. \text{with } i, j = 0, 1, \ldots, L-1 \text{ and } C_i[n] \cap C_j[n] \neq \phi\right\}$$

where function $f(\bullet)$ selects the subset index p if all frontier decisions associated to the representative $\bar{c}_p[n]$ results in favor of it.

In another embodiment, the decision frontiers determined by the decision boundary calculator 212 may be based on computing a representative point of the overlapping points between neighbor subsets, e.g.:

$$\{v_{1,j}: j=1, \ldots, q\} = \{\text{real}(\bar{c}_{i,j}[n]): \forall i \neq j, \text{ with } i, \\ j=0,1,\ldots,L-1 \text{ and } C_i[n] \cap C_j[n] \neq \emptyset\}$$

$$\{v_{2,j}: j=1, \ldots, q\} = \{\text{imag}(\bar{c}_{i,j}[n]): \forall i \neq j, \text{ with } i, \\ j=0,1,\ldots,L-1 \text{ and } C_i[n] \cap C_j[n] \neq \emptyset\} \quad (14)$$

where $$\bar{c}_{i,j}[n] = \frac{1}{|C_i[n] \cap C_j[n]|} \sum_{c \in C_i[n] \cap C_j[n]} c \quad (15)$$

Figure 4:
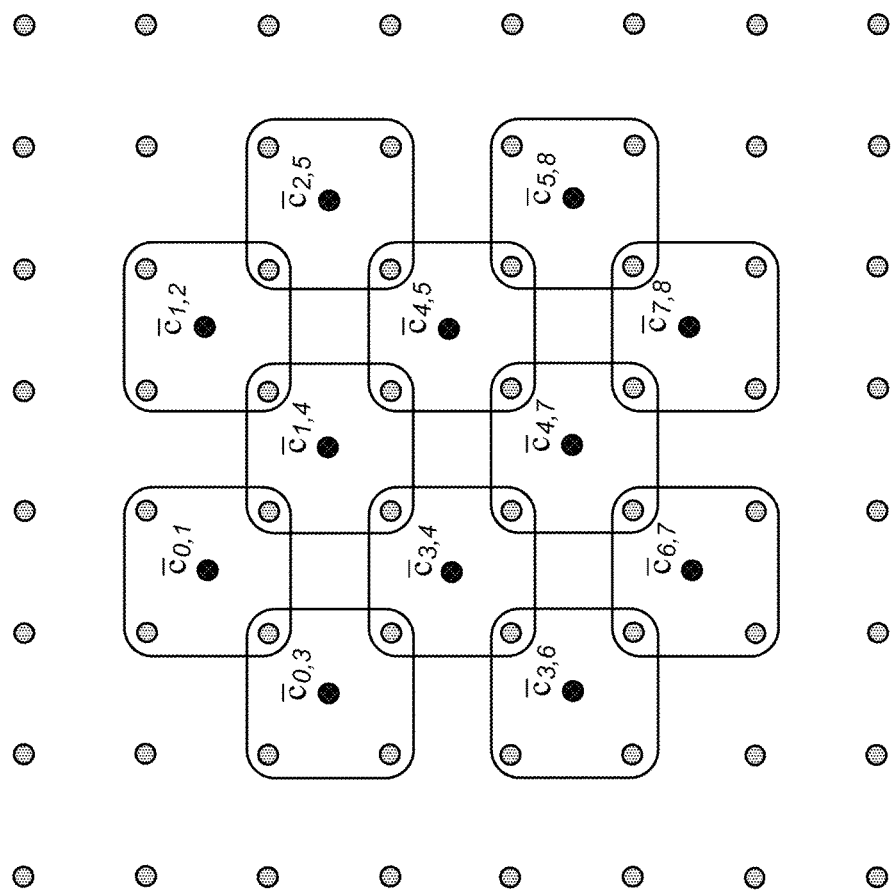
FIG. 4 illustrates an example QAM64 constellation with a set of representative points.

Further reduction of complexity is possible with negligible performance penalty by computing an estimation of $\bar{c}_{i,j}[n]$ using a subset of the points in the full set of overlapping points $C_i[n] \cap C_j[n]$. For example, in one embodiment, the center points of this interception set may be used. FIG. 4 illustrates an example QAM64 constellation and shows an example subset of points in $C_i[n] \cap C_j[n]$ that may be used for the calculation of the frontier points $\bar{c}_{i,j}[n]$ when the constellation points are grouped in the 9 overlapping subsets shown in FIG. 3. For example, in the illustrated embodiment, $\bar{c}_{i,j}[n]$ is calculated based on the set of four constellation points in the overlapping region between $C_i[n]$ and $C_j[n]$ closest to the center point.

Referring back to FIG. 2, the soft-output demapper 224 reuses the calculated distances from the hard-output demapper 222 and uses the inverse variance values from the noise power estimator 216 to determine a log likelihood ratio (LLR) for each non-differential bit of the constellation. The LLR at time n, denoted $L^{(nd)}[n]$, is defined as:

$$L^{(nd)}[n] = \log\left(\frac{P(d=0|r[n])}{P(b=1|r[n])}\right), \quad (16)$$

where r[n] is the received symbol at time n, b is a bit of a demapped symbol, P(b=0|r[n]) is the probability of b=0 given r[n] was received, and P(b=1|r[n]) is the probability of b=1 given r[n] was received.

A total of $\log_2(M)$ LLRs $L_k[n]$ with $k \in \{0, 1, \ldots, \log_2(M)-1\}$ (e.g. $k \in \{0, 1, \ldots, 5\}$ for QAM64) are calculated. Approximating the transmitted symbols as being independent and equally distributed, and estimating the equivalent noise model at the input of the demapper to be additive white gaussian noise (AWGN), $L_k^{(nd)}[n]$ can be expressed as $$L_k^{(nd)}[n] = \log\left(\frac{\sum_{s \in S_{b_k=0}} \exp\left(\frac{-1}{2\sigma^2}|r[n]-s|^2\right)}{\sum_{s \in S_{b_k=1}} \exp\left(\frac{-1}{2\sigma^2}|r[n]-s|^2\right)}\right) \quad (17)$$

where $S_{b_k=q}$ is a set of symbols such that the $k^{th}$ bit of each is q, and $\sigma^2$ is the variance of the noise.

The approximation in Eq. (18) below may used to reduce complexity in the LLR computation.

$$\sum_{x_i} \exp(-x_i^2) \approx \max_{x_i}[\exp(-x_i^2)] = \exp\left(-\min_{x_i}[x_i^2]\right) \quad (18)$$

The latter results in the LLR computation described in Eq. (19) as follows:

$$L_k^{(nd)}[n] \approx \frac{-1}{2\sigma^2}\left(\min_{s \in S_{b_k=0}}|r[n]-s|^2 - \min_{s \in S_{b_k=1}}|r[n]-s|^2\right) \quad (19)$$

On the other hand, the LLRs for the differential encoded bits of differential modulations can be expressed as:

$$L^{(d)}[n] = \log\left(\frac{P(b=0|r[n], r[n-1])}{P(b=1|r[n], r[n-1])}\right) \quad (20)$$

where n represents a time instant, r[n] is the received symbol at some time instant, b is a bit of the demapped symbol, P(b=0|r[n], r[n−1]) is the probability that bit b=0 given r[n] and r[n−1] were received, and P(b=1|r[n], r[n−1]) is the probability that bit b=1 given r[n] and r[n−1] were received. Note that not all bits of a differential modulation must be differential encoded. In this case the LLR of the non-differential bits may computed based on Eq. (19). Using similar approximations as before (i.e., independent and equally distributed transmitted symbols and AWGN noise), the LLR can be computed as $$L_k^{(d)}[n] \approx \log\left(\frac{\sum_{(s_c,s_p) \in Z_k^{(0)}} \exp\left(\frac{-1}{2\sigma^2}|r[n]-s_c|^2 + |r[n-1]-s_p|^2\right)}{\sum_{(s_c,s_p) \in Z_k^{(1)}} \exp\left(\frac{-1}{2\sigma^2}|r[n]-s_c|^2 + |r[n-1]-s_p|^2\right)}\right) \quad (21)$$

where $Z_k^{(b)} = \{(s_c, s_p): g_k(\angle(s_c) - \angle(s_p)) = b\}$, $g_k()$ is a function that maps angles to differential bits, and $\sigma^2$ is the variance of the noise. By using the approximation of Eq. (18), the differential LLR of Eq. (21) reduces to:

$$L_k^{(d)}[n] \approx \frac{-1}{2\sigma^2}\left(\min_{(s_c,s_p) \in Z_k^{(0)}}|r[n]-s_c|^2 + |r[n-1]-s_p|^2 - \min_{(s_c,s_p) \in Z_k^{(1)}}|r[n]-s_c|^2 + |r[n-1]-s_p|^2\right) \quad (22)$$

Therefore, the LLR calculation is reduced to the computation of eq. (19) and eq. (22) for the non-differential and differential bits respectively of the received symbol. Both equations involve the computation of two minimum values, one of which corresponds to the hard-decision symbol computed by the hard-output demapper 222. For each $b_k$ with $k=0; 1; \ldots; \log_2(M)-1$, the other symbol involved in the computation of $L_k$ is the constellation symbol with minimum distance to the received symbol r[n] chosen from the subset of constellation symbols in which the bit $b_k$ is different from the value of that bit in the hard-output demapper decision, i.e., $$L_k^{(nd)}[n] \approx \frac{-(-1)^{\hat{b}_k}}{2\sigma^2}\left(|r[n]-\hat{r}[n]|^2 - \min_{s \in S_{b_k \neq \hat{b}_k}}|r[n]-s|^2\right) \quad (23)$$

$$L_k^{(d)}[n] \approx \frac{-(-1)^{\hat{b}_k}}{2\sigma^2}\left(|r[n]-\hat{r}[n]|^2+|r[n-1]-\hat{r}[n-1]|^2 - \min_{(s_c,s_p)\in Z_k^{(1-\hat{b}_k)}}|r[n]-s_c|^2+|r[n-1]-s_p|^2\right)$$

where $\hat{r}[n]$ and $\hat{r}[n-1]$ are the hard-decision symbols detected by the hard-output demapper 222 and $\hat{b}_k$ is the corresponding bit value for the $k^{th}$ bit (differential or non-differential accordingly).

Eq. (23) can be further simplified with negligible performance penalty by restricting the set in which the minimum values are computed to the subset of constellation points $C_j[n]$ used in the hard-output demappers 222, e.g., $$L_k^{(nd)}[n] \approx \frac{-(-1)^{\hat{b}_k}}{2\sigma^2}\left(|r[n]-\hat{r}[n]|^2 - \min_{s\in \hat{S}_{b_k+\hat{b}_k}}|r[n]-s|^2\right) \quad (24)$$

$$L_k^{(d)}[n] \approx \frac{-(-1)^{\hat{b}_k}}{2\sigma^2}\left(|r[n]-\hat{r}[n]|^2+|r[n-1]-\hat{r}[n-1]|^2 - \min_{(s_c,s_p)\in \hat{Z}_k^{(1-\hat{b}_k)}}|r[n]-s_c|^2+|r[n-1]-s_p|^2\right)$$

with $$\hat{S}_{b_k,\hat{b}_k} = S_{b_k,\hat{b}_k} \cap \hat{C}[n] \quad (25)$$

$$\hat{Z}_k^{(1-\hat{b}_k)} = Z_k^{(1-\hat{b}_k)} \cap (\hat{C}[n]\times\hat{C}[n-1]) \quad (26)$$

where $\hat{C}[n]$ is the subset of constellation points that survived in the hard-output demapper 222 for the detection of the symbol $\hat{r}[n]$ and for which the distances to the received symbol $r[n]$ are already computed. $\hat{C}[n]\times\hat{C}[n-1]$ denotes the Cartesian product between $\hat{C}[n]$ and $\hat{C}[n-1]$.

Figure 5:
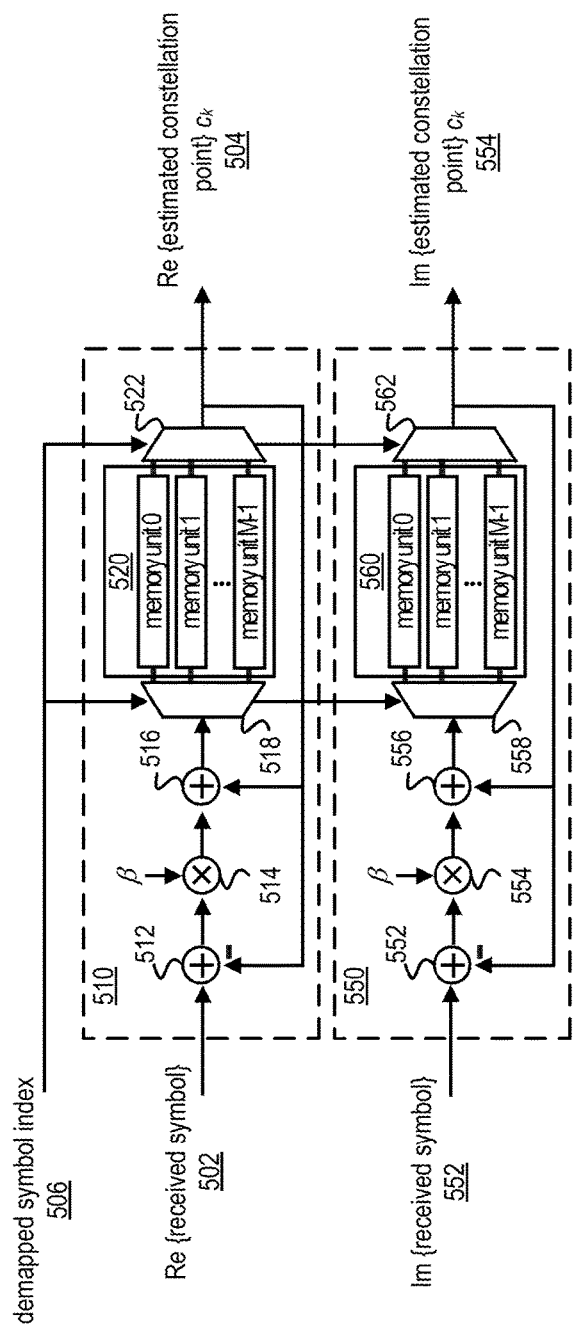
FIG. 5 illustrates an example embodiment of a constellation estimator for an adaptive demapper.

FIG. 5 illustrates an example embodiment of a constellation estimator 214 for implementing Eq. (1). In this embodiment, the constellation estimator 214 comprises a real component path 510 for updating a memory 520 storing real components of the constellation points C and an imaginary component path 550 updating a memory 560 storing imaginary components of the constellation points C. The real component path 510 comprises combining blocks 512, 516, multiplication block 514, a multiplexer 518, a demultiplexer 522, and the memory 520 which includes a plurality of memory units. The imaginary component path 550 includes corresponding elements including combining blocks 552, 556, multiplication block 554, a multiplexer 558, a demultiplexer 562, and a memory 560 which includes a plurality of memory units. The architectures and the operation of the real component path 510 and the imaginary component path 550 may be substantially similar or identical.

In the real component path 510, the current real components of each of the constellation points C are stored to respective memory units in the memory 520. During an update cycle, a demapped symbol index k 506 is received and controls the demultiplexer 522 to select the currently stored real portion of a constellation point Re $\{c_k\}$ corresponding to the demapped symbol index k 506. The demultiplexer 522 provides the real portion of the constellation point $c_k$ to the combining blocks 512, 516 in a feedback loop. The combining block 512 takes a difference between the real portion of the input symbol Re $\{r[n]\}$ and the real portion of the constellation point Re $\{c_k\}$ read from the memory 520. The multiplication block 516 multiplies the difference by a parameter β and the combining block 516 then sums the product with the real portion of the constellation point Re $\{c_k\}$ read from the memory 520. The multiplexer 518 writes the sum to the memory 520 at the appropriate memory unit indicated by the demapped symbol index k 506, overwriting the currently stored value.

The imaginary component path 550 operates analogously to the real component path 510 described above to update the imaginary portion of a constellation point Im $\{c_k\}$ corresponding to the demapped symbol index k 506 based on the received imaginary portion of the input symbol Im $\{r[n]\}$ during an update cycle. Particularly, the elements 552, 554, 556, 558, 560, 562 of the imaginary component path 550 may operate analogously to the respective corresponding components 512, 514, 516, 518, 520, 522 of the real component path 510.

After updating, the memories 520, 560, the constellation estimator 214 may output the updated constellation point $c_k$ by controlling the demultiplexers 522, 562 to read the real and imaginary portions respectively of the constellation point $c_k$ from the respective memories 520, 560.

Figure 6:
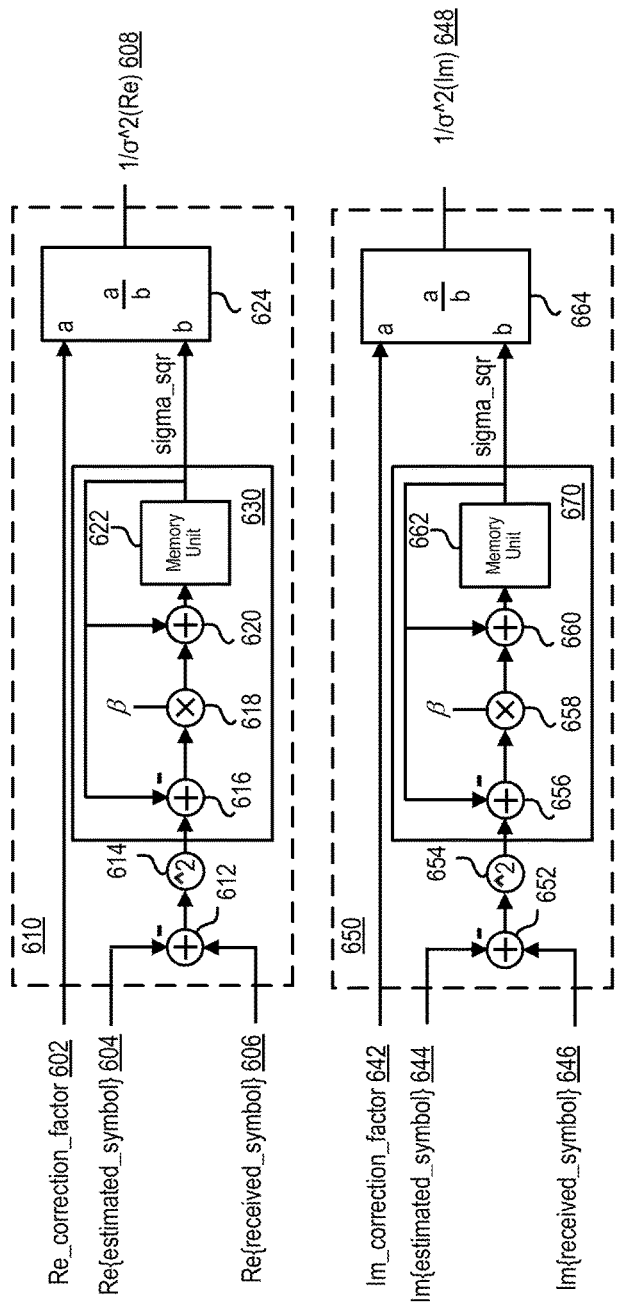
FIG. 6 illustrates an example embodiment of a noise power estimator for an adaptive demapper.

FIG. 6 illustrates an example embodiment of a noise power estimator 216 for implementing Eqs. (2)-(3). In this embodiment, the noise power estimator 216 comprises a real component path 610 for generating the inverse variance value for the real component of the input symbol r 606, the real component of the estimated symbol $\hat{r}$ and the correction factor $\alpha_i$ for the real portion, and an imaginary component path 650 for generating the inverse variance value for the imaginary component of the input symbol r 646, the imaginary component of the estimated symbol $\hat{r}$ and the correction factor $\alpha_q$ for imaginary portion. The real component path 610 comprises a combining block 612, a squaring block 614, a recursive filter 630, and an inverting block 624. The recursive filter 630 may comprise combining blocks 616, 620, a multiplication block 618, and a memory 622. The imaginary component path 650 comprises a corresponding combining block 652, a squaring block 654, a recursive filter 670, and an inverting block 664. The recursive filter 670 may comprise summation blocks 656, 660, a multiplication block 658, and a memory 662. The architectures and operation of the real component path 610 and the imaginary component path 650 may be substantially similar or identical.

In the real component path 610, the real portion of the instant noise is obtained by the summation block 612 as the difference between the real portion of the received symbol r and the real portion of the detected symbol $\hat{r}$. The difference is squared by squaring block 614 and fed to the recursive averaging filter 630. In the recursive averaging filter 630, the combining block 616 takes a difference between the squared value from the squaring block 614 and the current variance value stored to the memory 622. The multiplication block 618 multiplies the difference by a parameter β and the combining block 620 sums the product with the current variance value stored to the memory 622. The resulting value is stored to the memory as the updated variance for the real component. The inverting block 624 then divides the correction factor for the real component $\alpha_i$ by the updated variance to obtain the inverse variance value for the real component 608.

The imaginary component path 650 operates analogously to the real component path 610 described above to update the memory 662 with an updated variance value based on the imaginary components of the input symbol 646 and the estimated symbol 644 and to output an inverse variance value corresponding to the imaginary component 648 based on the updated variance and the correction factor for the imaginary component $\alpha_q$. Particularly, the elements 625, 654, 656, 658, 660, 662, 670, 664 of the imaginary component path 650 may operate analogously to the respective corresponding components 612, 614, 616, 618, 620, 622, 630, 624 of the real component path 610.

Figure 7:
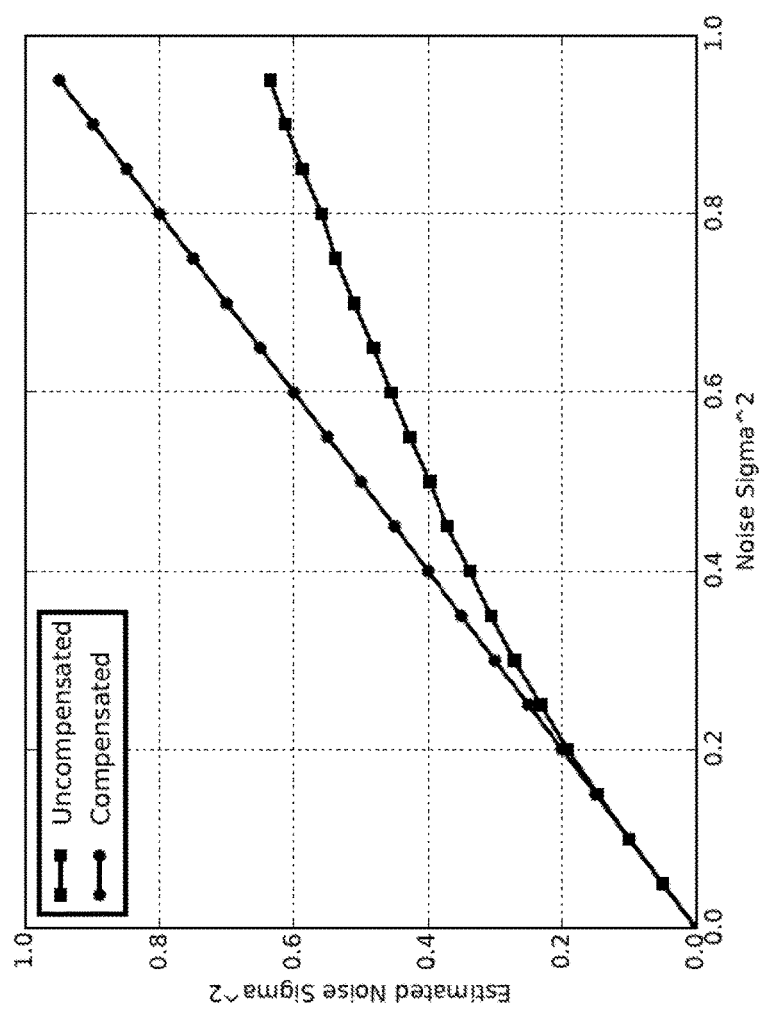
FIG. 7 is a graph illustrating the effect of applying a correction factor in a noise power estimation.

FIG. 7 is a graph illustrating the effects of applying the correction factors $\alpha_i$, $\alpha_q$ when generating the inverse variance values relative to an embodiment that does not use the correction factors and instead take direct inverse of the variance values (or equivalently, $\alpha_i = \alpha_q = 1$). As can be seen, using the compensation factors $\alpha_i$, $\alpha_q$ causes the estimate noise to better track the actual noise present in the signals.

The described adaptive demapper 118 may be used for demapping in a number of different modulation schemes including, for example, binary phase shift keying (BPSK) modulation schemes, quadrature phase shift keying (QPSK) modulation schemes, and quadrature amplitude modulation (QAM) schemes including, for example, QAM-16, QAM-64, or QAM-256 schemes. Furthermore, the adaptive demapper 118 may be used for both differential and non-differential modulation schemes. The adaptive demapper 118 may furthermore provide both hard and soft outputs to a decoder.

Although the detailed description contains many specifics, these should not be construed as limiting the scope but merely as illustrating different examples and aspects of the described embodiments. It should be appreciated that the scope of the described embodiments includes other embodiments not discussed in detail above. For example, the functionality of the various components and the processes described above can be performed by hardware, firmware, software, and/or combinations thereof.

Various other modifications, changes and variations which will be apparent to those skilled in the art may be made in the arrangement, operation and details of the method and apparatus of the described embodiments disclosed herein without departing from the spirit and scope of the invention as defined in the appended claims. Therefore, the scope of the invention should be determined by the appended claims and their legal equivalents.

The invention claimed is:

1. A communications receiver device using an adaptive demapper, the device comprising:
   an analog front end (AFE) configured to receive an analog input signal having an X-component and a Y-component and to convert the analog input signal to a digital input signal;
   an automatic gain control (AGC) module coupled to the AFE;
   a timing recovery module coupled to the AFE;
   a polarization/phase rotation/demodulation calibration (P/PR/DC) module coupled to the AFE;
   a coarse carrier recovery module coupled to the P/PR/DC module;
   a bulk chromatic dispersion equalizer module coupled to the P/PR/DC module;
   a 4-D fast equalizer module coupled to the bulk chromatic dispersion equalizer module;
   a carrier and polarization recovery module coupled to the 4-D fast equalizer module;
   an adaptive demapper module coupled to the carrier and polarization recovery module, the adaptive demapper module being configured to decode the digital input signal into symbols, the adaptive demapper comprising
      a first demapper module configured to decode the X-component of the digital input signal and generate a first log likelihood ratio (LLR) output, and
      a second demapper module configured to decode the Y-component of the digital input signal and generate a second log LLR output; and
   a forward error correction (FEC) and framer module coupled to the adaptive demapper module.

2. The device of claim 1 wherein the analog input signal comprises an optical input signal from an optical front end (OFE) module; wherein the optical input signal includes four signals denoted as XI (in-phase, X-polarized), XQ (quadrature-phase, X polarized), YI (in-phase, Y-polarized), and YQ (quadrature-phased, Y-polarized); and wherein the AFE is configured to convert the optical input signal into the digital input signal.

3. The device of claim 1 wherein the timing recovery module is configured to provide a sampling clock; and wherein the AFE is configured to sample the analog input signal according to the sampling clock.

4. The device of claim 3 wherein the AGC module is configured in a feedback loop with the AFE to provide a gain control signal to the AFE; and wherein the AFE is configured to apply a gain to the sampled analog input signals.

5. The device of claim 2 wherein the P/PR/DC module is configured to apply a rotation to the digital input signals to correct for skew or amplitude differences in the optical input signal.

6. The device of claim 5 wherein the coarse carrier recovery module is configured to provide a control signal to the P/PR/DC module; and wherein the P/PR/DC module is configured to apply the rotation based on the control signal.

7. The device of claim 1 wherein bulk chromatic dispersion equalizer module is configured to equalize the digital input signal to compensate for chromatic dispersion effects.

8. The device of claim 1 wherein the bulk chromatic dispersion equalizer module is configured in a feedback loop with the timing recovery module; and wherein the coarse carrier recovery module is configured in a feedback loop with the timing recovery module.

9. The device of claim 8 wherein the timing recovery module is configured to estimate the frequency and phase of a data signal outputted by the bulk chromatic dispersion equalizer; wherein the timing recovery module is configured to use the frequency and phase estimations to provide a sampling clock; and wherein the AFE is configured to sample the analog input signal according to the sampling clock.

10. The device of claim 1 wherein the 4-D fast equalizer module is configured to equalize the digital input signal to reduce signal distortion by compensating for intersymbol interference (ISI).

11. The device of claim 10 wherein the carrier and polarization recovery module is configured to receive the equalized digital input signal from the 4-D fast equalizer module and to estimate and compensate for differences between the equalized digital input signal and a local oscillator.

12. The device of claim 1 wherein the FEC and framer module is configured to perform error correction on the digital input signal and to frame digital input signal according to a framing protocol for an external framer interface.

13. The device of claim 1 implemented as an application specific integrated circuit (ASIC).

14. The device of claim 1 wherein the first and second demapper modules each comprise
- a hard-output demapper circuit to receive an input symbol and to generate a current detected symbol corresponding to a constellation point on a current constellation closest to the input symbol;
- a noise power estimator circuit to determine a current noise power estimate by updating a previous noise power estimate based on a difference between the input symbol and the current detected symbol and to generate a corrected inverse variance value based on the current noise power estimate;
- a soft-output demapper circuit to determine a log likelihood ratio corresponding to the current detected symbol based on the corrected inverse variance value; and
- a constellation estimator circuit to update the constellation point in the current constellation corresponding to the current detected symbol to generate an updated constellation based on a difference between the constellation point and the received input symbol.

15. The device of claim 14 wherein the first and second demapper modules each further comprise a boundary estimator circuit to update a current plurality of decision boundaries based on the updated constellation; and
- wherein the hard-output demapper is further configured to apply a current plurality of decision boundaries to the input symbol.

16. The device of claim 14 wherein the constellation estimator circuit comprises:
- a memory to store the current constellation;
- a demultiplexer to read the constellation point from the memory based on a demapped symbol index corresponding to the constellation point determined by the hard-output demapper;
- a first combining circuit to compute a difference between the input symbol and the constellation point read from the memory;
- a multiplication circuit to compute a product between the difference and a predefined parameter;
- a second combining circuit to compute a sum of the product and the constellation point in the current constellation; and
- a multiplexer to store the sum to the memory as an updated constellation point corresponding to the updated constellation.

17. The device of claim 14 wherein the noise power estimator circuit comprises:
- a memory to store the previous noise power estimate;
- a first combining circuit to compute a first difference between the input symbol and the current detected symbol;
- a squaring circuit to square the first difference to produce a squared difference value;
- a second combining circuit to compute a second difference between the squared difference value and the previous noise power estimate;
- a multiplication circuit to compute a product of the second difference and a predefined parameter;
- a third combining circuit to compute a sum of the second difference and the previous noise power estimate and to output the sum to the memory as the current noise power estimate;
- an inverting circuit to divide a correction parameter by the current noise power estimate to generate the corrected inverse variance value.

18. A method for operating communications receiver device using an adaptive demapper, the method comprising:
- receiving, by an analog front end (AFE), an analog input signal having an X-component and a Y-component;
- converting, by the AFE, the analog input signal to a digital input signal;
- providing, by an automatic gain control (AGC) module coupled to the AFE, a gain control signal to the AFE;
- providing, by a timing recovery module coupled to the AFE, a sampling clock;
- applying, by a polarization/phase rotation/demodulation calibration (P/PR/DC) module coupled to the AFE, a rotation to the digital input signal to correct for skew or amplitude differences;
- providing, by a coarse carrier recovery module coupled to the P/PR/DC module, a control signal to the P/PR/DC module;
- equalizing, by a bulk chromatic dispersion equalizer module coupled to the P/PR/DC module, the digital input signal to compensate for chromatic dispersion effects;
- equalizing, by a 4-D fast equalizer module coupled to the bulk chromatic dispersion equalizer module, the digital input signal to reduce signal distortion by compensating for intersymbol interference (ISI);
- compensating, by a carrier and polarization recovery module coupled to the 4-D fast equalizer module; the equalized digital input signal; for differences between the equalized digital input signal and a local oscillator;
- decoding, by an adaptive demapper module coupled to the carrier and polarization recovery module, the digital input signal into symbols;
- wherein decoding the digital input signal into symbols comprises
  - decoding, by a first demapper module of the adaptive demapper module, the X-component of the digital input signal, and
  - generating, by the first demapper module, a first log likelihood ratio (LLR) output, and
  - decoding, by a second demapper module of the adaptive demapper module, the Y-component of the digital input signal, and
  - generating, by the second demapper module, a second log LLR output; and
- performing, by a forward error correction (FEC) and framer module coupled to the adaptive demapper module, an error correction on the digital input signal; and
- framing, by the FEC and framer module, the digital input signal according to a framing protocol for an external interface.

19. The method of claim 18 wherein the analog input signal comprises an optical input signal from an optical front end (OFE) module; wherein the optical input signal includes four signals denoted as XI (in-phase, X-polarized), XQ (quadrature-phase, X polarized), YI (in-phase, Y-polarized), and YQ (quadrature-phased, Y-polarized); and
- wherein converting the analog input signal to the digital input signal comprises converting the optical input signal into the digital input signal.

20. The method of claim 18 wherein receiving the analog input signal comprises sampling, by the AFE, the analog input signal according to the sampling clock.

21. The method of claim 20 further comprising applying, by the AFE, a gain to the sampled analog input signal.

22. The method of claim 18 wherein applying the rotation to the digital input signal comprises applying, by the P/PR/DC module, the rotation based on the control signal from the coarse carrier recovery module.

23. The method of claim 18 further comprising using data from the bulk chromatic dispersion equalizer module in a feedback loop with the timing recovery module and using data from the coarse carrier recovery module in a feedback loop with the timing recovery module to provide the sampling clock.

24. The device of claim 23 providing the sampling clock includes
estimating the frequency and phase of a data signal outputted by the bulk chromatic dispersion equalizer; and
using the frequency and phase estimations to provide a sampling clock.

25. The method of claim 18 wherein decoding the digital input signal and generating the LLR output by each of the first and second demapper modules comprises:
receiving an input symbol;
demapping the input symbol in a hard-output demapper to generate a current detected symbol corresponding to a constellation point on a current constellation closest to the input symbol;
determining a corrected inverse of a current noise power estimate by updating a previous noise power estimate based on a difference between the input symbol and the current detected symbol;
determining, in a soft-output demapper, a log likelihood ratio corresponding to the current detected symbol based on the corrected inverse of the current noise power estimate; and
updating the constellation point in the current constellation corresponding to the current detected symbol to generate an updated constellation based on a difference between the constellation point and the received input symbol.

26. The method of claim 25 wherein demapping the input symbol comprises applying a current plurality of decision boundaries to the input symbol, and wherein the method further comprises:
updating the current plurality of decision boundaries based on the updated constellation.

27. The method of claim 25 wherein demapping the input symbol comprises:
partitioning the current constellation into a plurality of overlapping subsets of constellation points;
determining a selected subset from the plurality of overlapping subsets meeting a decision criterion;
determining distances between the input symbol and each constellation point in the selected subset; and
determining the constellation point having a smallest distance to the input symbol in the selected subset.

28. The method of claim 27 wherein determining the selected subset comprises:
determining a plurality of representative points each corresponding to one of the plurality of overlapping subsets;
determining distances between the input symbol and each of the representative points;
determining a closest representative point of the plurality of representative points having a smallest distance to the input symbol;
determining the selected subset that corresponds to the closest representative point.

29. The method of claim 27 wherein determining the selected subset comprises:
determining a plurality of representative points each corresponding to one of the plurality of overlapping subsets;
determining a plurality of mean points between pairs of neighboring representative points corresponding to pairs of subsets that overlap with each other;
determining a plurality of decision frontiers based on the mean points; and
applying the plurality of decision frontiers to determine the selected a subset.

30. The method of claim 27 wherein determining the selected subset comprises:
determining a plurality of representative points each corresponding to a different pair of overlapping subsets;
determining a plurality of decision frontiers based on the representative points; and
applying the plurality of decision frontiers to determine the selected subset.

31. The method of claim 30 wherein determining the plurality of representative points comprises:
determining an average of overlapping points in each of the pairs of overlapping subsets.

32. The method of claim 30 wherein determining the plurality of representative points comprises:
in each of the pairs of overlapping subsets, selecting a subset of overlapping center points; and
determining an average of the subset of overlapping center points in each of the pairs of overlapping subsets.

33. The method of claim 27 wherein determining the log likelihood ratio comprises:
computing the log likelihood ratio based on the distances between the input symbol and each constellation point in the selected subset.

34. The method of claim 25 wherein determining the corrected inverse of the noise power estimate comprises:
applying a nonlinear correction function to the noise power estimate to compensate for errors in the current detected symbol.

35. The method of claim 25 wherein determining the log likelihood ratio comprises:
computing log-likelihood values for each bit of the input symbol based on a distance of the input symbol to a closest constellation point selected from a subset of constellation points that have a different corresponding bit $b_k$ than a bit $\hat{b}_k$ of the current detected symbol.

36. The method of claim 25 wherein determining the log likelihood ratio further comprises:
computing log-likelihood values based on a distance between the input symbol and the current detected symbol.

37. The method of claim 25 wherein determining the log likelihood ratio further comprises:
determining for each bit of the input symbol, a group of constellation points selected from a subset of constellation points used in the hard-output demapper that have a different corresponding bit $b_k$ than a bit $\hat{b}_k$ of the current detected symbol; and
determining log-likelihood values for each bit of the input symbol further based on a distance between the input symbol and a closest constellation point selected from a group of constellation points, the group of constellation points selected from a subset of constellation points used in the hard-output demapper that have a different corresponding bit $b_k$ than a bit $\hat{b}_k$ of the current detected symbol.

38. The method of claim 25 wherein updating the constellation point comprises:

reading the constellation point from a memory based on a demapped symbol index corresponding to the constellation point determined by the hard-output demapper;

computing a difference between the input symbol and the constellation point read from the memory;

computing a product between the difference and a predefined parameter;

computing a sum of the product and the constellation point in the current constellation; and storing the sum to the memory as an updated constellation point corresponding to the updated constellation.

39. The method of claim 25 wherein determining the corrected inverse of the noise power estimate comprises:

computing a first difference between the input symbol and the current detected symbol;

squaring the first difference to produce a squared difference value;

computing a second difference between the squared difference value and the previous noise power estimate;

computing a product of the second difference and a predefined parameter;

computing a sum of the second difference and the previous noise power estimate; and dividing a correction parameter by the current noise power estimate to generate the corrected inverse variance value.

* * * * *